Feb. 22, 1938.　　　D. PARKINSON　　　2,108,973
PNEUMATIC TIRE
Filed Nov. 5, 1936
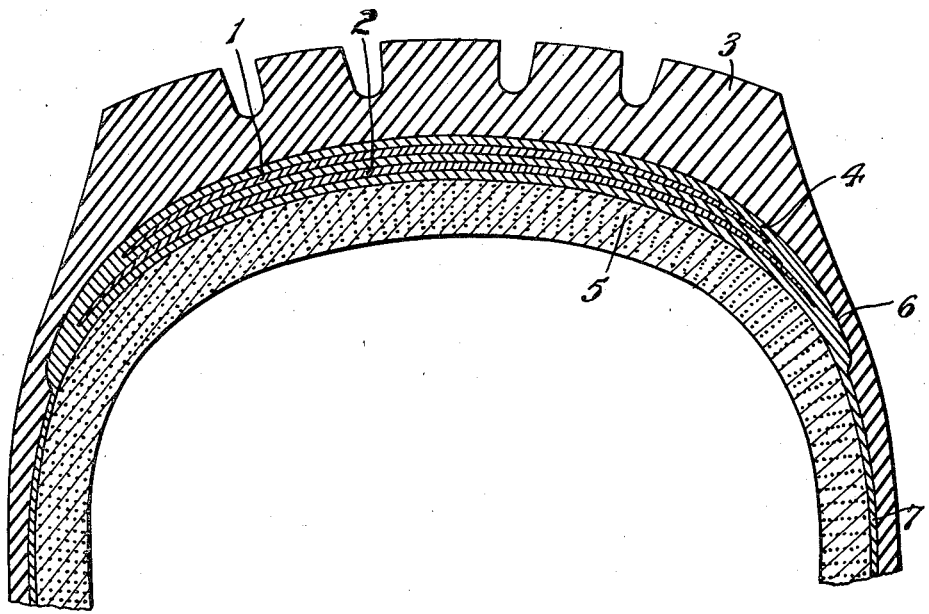
Inventor
Donald Parkinson
by Heina & Rauber, his attorneys Patented Feb. 22, 1938

2,108,973

UNITED STATES PATENT OFFICE 2,108,973

PNEUMATIC TIRE

Donald Parkinson, Sutton Coldfield, England, assignor to Dunlop Tire and Rubber Corporation, a corporation of New York Application November 5, 1936, Serial No. 109,253
In Great Britain September 3, 1935

5 Claims. (Cl. 152—18)

This invention relates to improvements in pneumatic tires of the type having a tread built upon a plurality of layers of fabric embedded in rubber and joined to the tread by an intervening layer of relatively soft cushion rubber.

In tires of the above type it has heretofore been customary to embed in the intermediate cushioning layer one or more layers of textile reinforcement called "breakers" or "breaker strips". These breakers or breaker strips consist usually of fabric with weak woven threads or of square woven canvas of open weave to permit the rubber to penetrate through the interstices and obtain a better adherence. It has been proposed to omit such breaker fabric altogether and also to use crimped fabric which is substantially untensioned after shaping the tire. Under the stresses that occur in tires, particularly in those used for lorries and omnibuses, the adjacent surfaces of the cushion layers and the fabric of the breaker strips tend to separate. Also variations in the bias angle of existing types of cord fabric breaker strip tend to a cracking of the tread.

In my invention the resistance to separation or disintegration of the rubber between the tread and the fabric body of the tire cover is greatly increased or improved by providing between the casing plies and the tread an intermediate body of soft cushion rubber vulcanized to the tread and casing plies and having in place of the cord or woven fabric one or more uniformly flexible layers of relatively hard rubber, that is, rubber somewhat harder than that of the tread.

The various features of the invention are illustrated by way of example in the accompanying drawing which shows a cross section or radial section of a tire construction having a cushioning layer embodying my invention.

In my invention I provide a number of layers, two layers 1 and 2 being shown by way of example, in a cushioning layer 4 between the tread portion 3 and the underlying fabric layers 5. These layers 1 and 2 are thicker at their center and gradually decrease in thickness from their central portions toward the edges at each side of the tire. For example, the thickness of each hard rubber layer at the center may be twice that at the edge.

The tread 3 is vulcanized directly to the upper or greater diameter surface of a body 4 of cushion rubber and the uppermost casing ply 5 is vulcanized to the under surface of the body of cushion rubber.

The hard rubber layers conform in cross sectional profile to the curvature of the body of cushion rubber in which they are embedded and which is of greater depth beneath the central portion of the tread. The curvature of the greater diameter surface of the cushion rubber increases at the edges 6 to merge into thin layers 7 of uniform thickness extending down the walls of the tire.

The span or transverse extent of the upper layer 1, where there are two or more, is less than the under layer or layers 2 which extend substantially to the shoulder of the tire cover.

The thickness of the hard rubber layer or layers where two are employed may be approximately one fifth of the radial depth of the body of cushion rubber, the said hard layers being spaced uniformly from one another and from the upper and lower surfaces of the cushion rubber.

In a modification, where two or more layers are used, the under layer nearer the body of the tire cover may be thicker than that nearer the tread.

Suitable compositions for the above layers are set forth below in parts by weight in the accompanying examples, in the first of which there is no fibrous content. In the second example, a small proportion of fibres, such as cotton and of about ⅓ mm. in length, are included and alternative proportions of the remaining constituents are also given. Where the harder rubber layers contain a larger proportion of fibre, as indicated in Example 3, the fibres are preferably arranged by calendering to lie with their axes transversely of the tread whereby the layers containing them are rendered comparatively inextensible or less extensible transversely, than circumferentially of the tread to prevent or minimize tread cracking at the base of the tread grooves.

*Example 1*

|  | Per cent |
|---|---|
| Rubber | 27.3125 |
| Sulphur | 1.0000 |
| Mercaptobenzothiazole | 0.1875 |
| Stearic acid | 0.5000 |
| Pine tar | 2.0000 |
| Mineral rubber | 2.0000 |
| Zinc oxide | 45.0000 |
| Lamp black | 12.0000 |
| Treated precipitated calcium carbonate | 10.0000 |
|  | 100.0000 |

Example 2

|  | Per cent | Per cent |
|---|---|---|
| Rubber | 50.5 | 59.4375 |
| Sulphur | 1.375 | 2.0 |
| Mercaptobenzothiazole | 0.375 | 0.3125 |
| Stearic acid | 0.50 | 0.5 |
| Pine tar | 1.50 | 0.75 |
| Zinc oxide | 23.50 | 4.00 |
| Lamp black | 10.00 | 19.50 |
| Cotton fibre | 10.00 | 11.00 |
| Mineral rubber | 2.25 | 2.5 |
|  | 100.00 | 100.000 |

Example 3

|  | Per cent |
|---|---|
| Rubber | 47.50 |
| Sulphur | 1.75 |
| Mercaptobenzothiazole | 0.25 |
| Stearic acid | 0.50 |
| Pine tar | 2.00 |
| Zinc oxide | 18.00 |
| Lamp black | 5.00 |
| Cotton fibres | 25.00 |
|  | 100.00 |

By embedding a sheet of rubber harder than that of the tread in the soft cushion rubber between the tread and the casings, the blows received on the tread as the latter travels over roads at high speeds are intercepted. A rubber sheet is less apt to fracture under concussion than is a fabric sheet. Also, it forms a better bond with adjacent layers of rubber with which it is vulcanized. The resultant action, therefore, is that impact and concussion received by the tread are transmitted to a harder object, much as though the impact from a relatively softer material, such as a wooden mallet, were received on a sheet of harder material such as steel or copper. These impacts are, therefore, intercepted by the harder rubber strip and not transmitted to the underlying casings. Viewed from another viewpoint, these impacts are distributed and then transmitted to the casing plies more as a distributed pressure than as a sudden concentrated impact.

What I claim is:

1. A pneumatic tire comprising a plurality of fabric casing plies, a tread superposed on said plies and having relatively thin side walls extending over said wall portions of said plies, an intermediate body of relatively soft cushion rubber vulcanized to the tread and casing plies, and a breaker strip of uniformly flexible rubber harder than that of the tread embedded in said cushion rubber below the tread portion of the tire, terminating short of the side walls of the tire and separating all of said plies from said tread.

2. A pneumatic tire comprising a plurality of fabric casing plies, a tread superposed on said plies and having relatively thin side walls extending over said wall portions of said plies, an intermediate body of relatively soft cushion rubber vulcanized to the tread and casing plies, and breaker strips of uniformly flexible rubber harder than that of the tread in superposed position and spaced one from the other embedded in said cushion rubber below the tread portion of the tire terminating short of the side walls of the tire and separating all of said plies from the superposed tread.

3. The tire of claim 1 in which said breaker strip contains fibers.

4. The tire of claim 2 in which the lower of the two breaker strips is thicker than the breaker strip superposed above it.

5. The tire of claim 2 in which the lower of the two breaker strips is wider than the upper one.

DONALD PARKINSON.